United States Patent

Aoki

[11] 3,900,402
[45] Aug. 19, 1975

[54] HEMODIALYZER

[76] Inventor: Risaburo Aoki, No. 16-1, Ohtsukamachi, Yukigaya, Ohta-ku, Tokyo, Japan

[22] Filed: Mar. 12, 1973

[21] Appl. No.: 339,970

[30] Foreign Application Priority Data
Jan. 19, 1973  Japan.................................. 48-8782

[52] U.S. Cl. ............................................... 210/321
[51] Int. Cl........................ B01d 13/00; B01d 31/00
[58] Field of Search ................................... 210/321

[56] References Cited
UNITED STATES PATENTS
2,650,709  9/1953  Rosenak et al. .................... 210/321
2,683,117  7/1954  Rosenak et al. .................... 210/321
3,522,885  8/1970  Lavender et al. ................... 210/321

Primary Examiner—Frank A. Spear, Jr.
Assistant Examiner—F. Lander
Attorney, Agent, or Firm—Milton Osheroff

[57] ABSTRACT

A hemodialyzer comprising a plurality of dialyzer packs each having a flat dialyzer tube, a fibrous sheet of paper or like material directly applied to the outer surface of said dialyzer tube, a flexible net made of such material as synthetic resins or metals directly applied over the outer surface of said fibrous sheet, and a flat sealed outer sack enclosing said dialyzer tube, said fibrous sheet and said net, whereby direct application of said fibrous sheet to the outer surface of the dialyzer tube with said net applied over the outer surface of the fibrous sheet greatly increases the dialyzing efficiency.

5 Claims, 11 Drawing Figures

F I G. 3
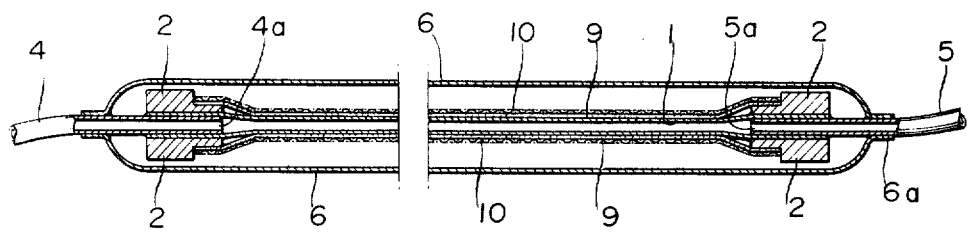
F I G. 4
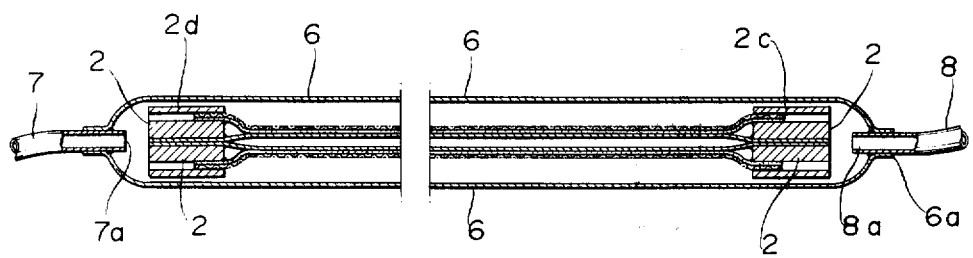
F I G. 5
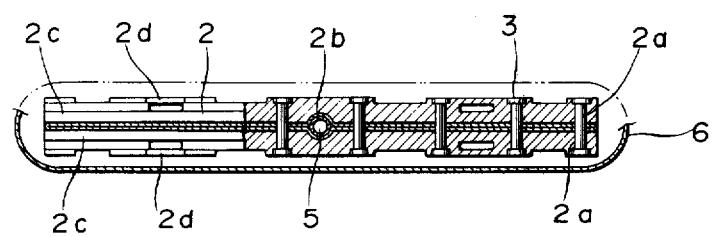
F I G. 6
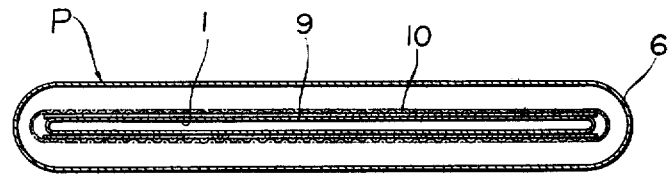

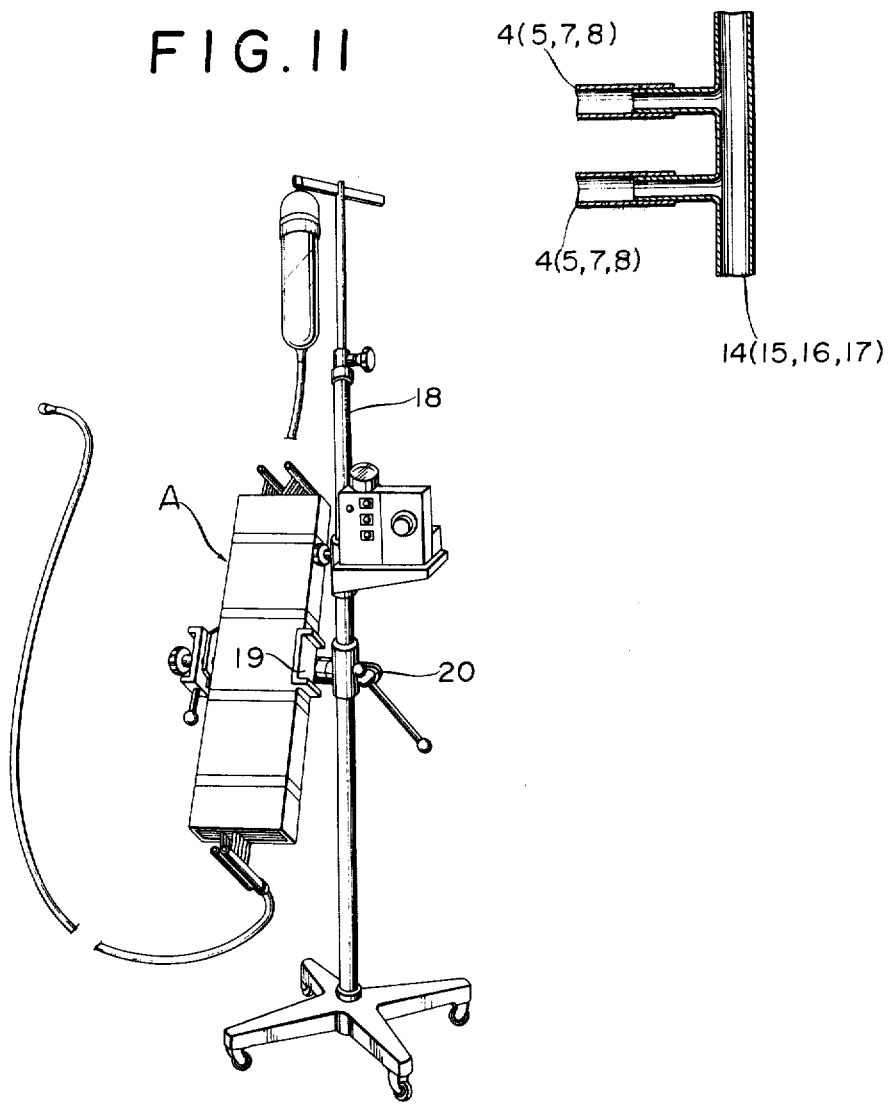

3,900,402

1
HEMODIALYZER

BACKGROUND OF THE INVENTION

The prior-art hemodialyzer includes one employing a sandwich-like structure consisting of a pair of dialyzing films of such material as cellophane and a base plate interposed therebetween. This device is a unit of a large size, so that its operation and preparation involved are inconvenient. Also, it is impossible to render inoperative or replace one of the incorporated dialyzer packs, since these packs are not stacked. There has also been developed the so-called coil-type hemodialyzer, which uses pipe-formed dialyzing films accommodated in a dislysis bath. In this type of device, however, the disadvantage of increased rate of flow of blood is structurally inevitable. Also, it has another disadvantage in that the resistance against upward blood flow is increased, so that a spacial pump is required.

SUMMARY OF THE INVENTION

The primary object of the present invention is to provide a hemodialyzer of stack type using a plurality of dialyzer packs stacked one above another and so adapted as to permit circulation (and/or flowing out) of blood and dialysate.

A second object of the invention is to protect the dialyzer tube and better the dialyzing efficiency of the tube by packing the tube with paper or like material.

A third object of the invention is to uniformalize or diffuse the flow of blood within the dialyzer tube by providing a net adapted to cover the paper packing the dialyzer tube.

A fourth object of the invention is to support the dialyzer pack with a pack support such that the pack will now swell beyond a predetermined thickness even with the swelling force of circulated (and/or flowed out) blood and dialysate.

A fifth object of the invention is to join the dialysate lead tubes and blood lead tubes of the individual dialyzer packs on the outside thereof so as to be able to cut the operation of only the pack that has become leaky by clamping only the lead tubes thereof.

A sixth object of the invention is to stably connect blood lead tubes to the opposite ends of the dialyzer tube through a pair of rigid board members adapted to clamp and seal the opposite open ends of the dialyzer tube.

BRIEF DESCRIPTION OF THE DRAWING

The drawing illustrates an embodiment of the invention, and in which:

FIG. 3 is a sectional view taken along line III—III in FIG. 2;

FIG. 4 is a sectional view taken along line IV—IV in FIG. 2;

FIG. 5 is a sectional view taken along line V—V in FIG. 2;

FIG. 6 is a sectional view taken along line VI—VI in FIG. 2;

FIG. 10 is a sectional view showing the state of connection of lead tubes to a main lead pipe; and FIG. 11 is a perspective view showing the embodiment supported by a support.

DETAILED DESCRIPTION OF THE PREFERRED EMBODIMENT

Figure 1:
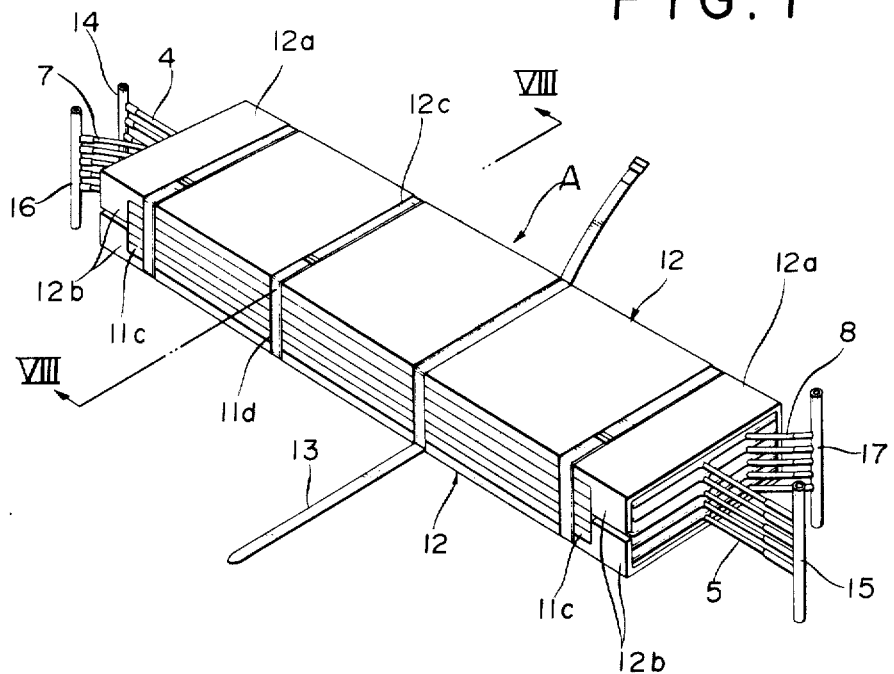
FIG. 1 is a perspective view of an embodiment of the invention.
Figure 2:
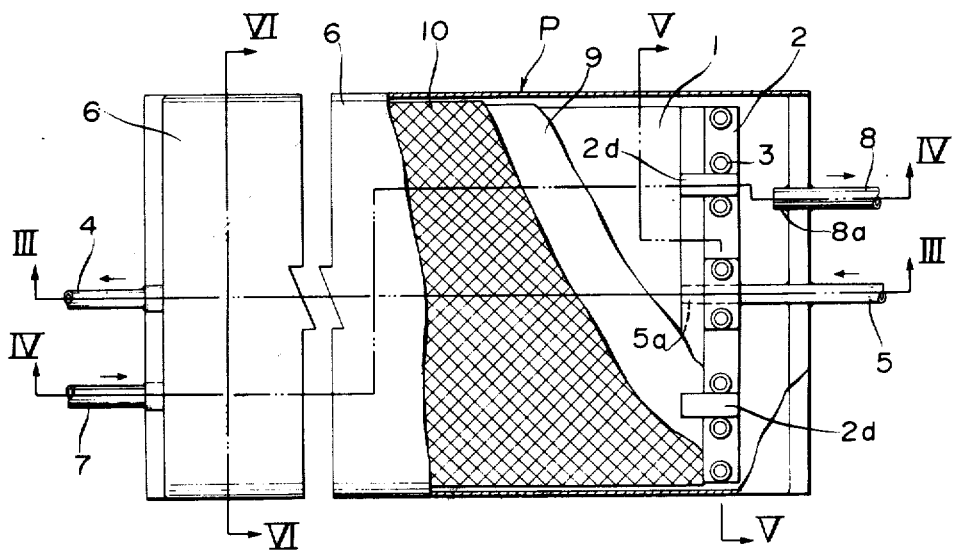
FIG. 2 is a plan view, partly broken away, showing an example of the pack.

According to the invention there is provided a hemodialyzer, commonly termed artificial kidney, which offers less resistance against the blood flow, has simple construction and excellent dialyzing function, is compact and convenient to handle and can be manufactured inexpensively.

It will now be described in detail in conjunction with the drawing.

Referring to the drawing, and more particularly to FIGS. 2 to 6, reference numeral 1 designates a dialyzer tube made of, for instance, a thin cellophane or silicon film. It is rendered flat with its opposite end portions clamped and sealed between upper and lower board members 2, 2 of a plastic material. The board members 2, 2 are assembled together by rivets 3. The dialyzer tube 1 communicates with blood lead tubes 4 and 5 individually connected to respective ends 4a and 5a of the tube 1. The lead tubes are provided one at each end of the tube 1 and held against movement by the board members 2, 2. Since they are stably held in position by the rigid board members 2, they will not be deformed even with an external pressure, which is advantageous in that a constant blood flow can be maintained. These blood lead tubes 4 and 5 serve to lead blood into and out of the interior of the dialyzer tube 1, and they are usually provided centrally of the board members in order to obtain uniform flow of blood within the dialyzer tube 1. The board members 2, 2 may be integrally assembled by the rivets 3 as in this example or by other assembling means such as bolts (or an adhesive). The board members 2 are each formed with small holes 2a for passing the rivets 3 and grooves 2b for passing the lead tubes 4 and 5. The lead tubes 4 and 5 are usually made of a soft material such as vinyl resins.

The dialyzer tube 1 is enclosed within a flat outer sack 6, which is made of a soft material such as vinyl resins and communicates with dialysate lead tubes 7 and 8 connected to it. The blood lead tubes 4 and 5 penetrate the outer sack 6 and are hermetically sealed thereto by means of fusion bonding. The dialysate lead tubes 7 and 8 serve to lead dialysate into the interior of the outer sack 6 (more particularly into the space between outer sack 6 and dialyzer tube 1), and similar to the blood lead tubes 4 and, 5, they are provided one at each end of the outer sack. The inner ends 7a and 8a of these tubes 7 and 8 are located between the associated end of the board members 2, 2 and the associated sealed end 6a of the outer sack 6 in order to uniformly provide dialysate to the upper and lower sides of the dialyzer tube 1 and uniformly take out dialysate and exhaust it from the upper and lower sides of the tube 1. To this end, the outer side of the board member 2 is made rugged to permit the flow of dialysate. In the instant example of FIG. 2, the tubes 7 and 8 are open to the interior of the outer sack in a diagonal relation to each other to provide for uniform dialysis action over the transversal direction.

Figure 7:
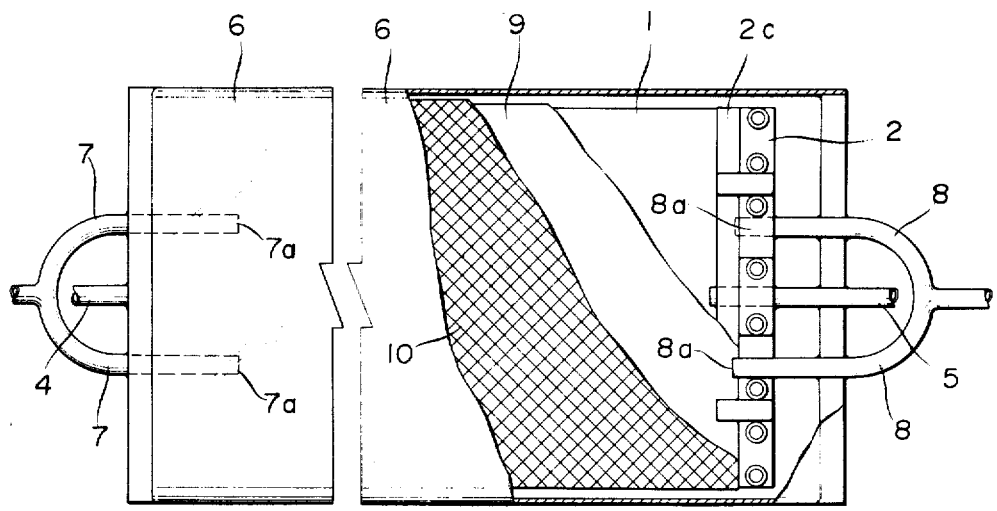
FIG. 7 is a plan view, partly broken away, showing another example of the pack.

FIG. 7 shows another example of the dialyzer pack. In this example, the dialysate lead tube 7 and 8 are each branched into two branches, which penetrate the associated end of the outer sack 6 and terminate at the inner ends 7a or 8a on opposite sides of the assembly of the board members 2, 2 (or opposite sides of the dialyzer tube), with the blood lead tubes 4 and 5 within the outer sack extending between the corresponding two branches. With this structure, uniform dialysis action over the transversal direction of the outer sack may be obtained for two branches of each dialysate lead tube extend on opposite sides of the blood lead tube 4 or 5, and also uniform dialysis action between the upper and lower sides of the dialyzer tube 1 may be obtained for the two branches of each dialysate lead tube terminate on opposite sides of the tube 1.

The dialyzer tube 1 is enclosed by a fibrous sheet 9 of paper or like material directly applied to the outer surface of the tube 1, and a flexible net 10 made of such material as synthetic resins or metals is applied over the outer surface of the fibrous sheet 9. The fibrous sheet 9 absorbs dialysate, so that the dialysate can be brought into contact with the outer surface of the dialyzer tube 1 more efficiently. Thus, it promotes the dialysis action. Also, since it entirely surrounds the dialyzer tube 1 and prevents the direct contact thereof with the net 10, it can prevent various inconveniences. If it was absent, the dialyzer tube 1 in operation would swell into the meshes of the net 10, thus increasing the rate of flow of blood that much and resulting in sooner breakage of the dialyzer tube 1. By way of example, a wide improvement of the dialyzing efficiency by 10 to 20 percent with the use of the fibrous sheet 1 has been experimentarily confirmed. The main role of the net 10 is to cause uniform diffusion of dialysate over the inner surface of the outer sack 6. This is directly attributable to the meshes of the net. Part of the mesh (or in the illustrated example a major portion of the mesh since it is rhombic or lozenge-shaped without any portion parallel to the direction of flow of dialysate) impedes or resists against the straight flow of dialysate, so that the dialysate meanders as it encounters this resisting portion. Also, it should not be overlooked that partial contact between dialyzer tube 1 and outer sack 6 (which is likely to result where liquid is caused to pass between opposing films slightly spaced apart) will not result by virtue of the presence of the net 10 and fibrous sheet 9, so that otherwise possible partial flow of the dialysate is perfectly eliminated. Further, it is possible to use only the fibrous sheet 9 and dispense with the net 10. In such case, the outer surface of the fibrous sheet 9 may be suitably made rugged to impart it with the function of diffusing dialysate. Indicated at 2c is a stepped portion serving to lock the fibrous sheet 9 and net 10 against lateral slip with respect to the dialyzer tube 1, and indicated at 2d is a keep member downwardly pressing the end of the net 10 to prevent it from floating off.

The work of purifying blood is done by admitting dialysate through the dialysate lead tube 7 into the outer sack 6 and exhausting it through the other dialysate lead tube 8 while leading blood into the dialyzer tube 1 through the blood lead tube 5 and out of the dialyzer tube through the other blood lead tube 4. In use, the above dialyzer pack (hereinafter referred to as pack) is combined with a pack support. If it is used by itself, the dialyzer tube is prone to swelling, increasing the blood quantity.

Figure 9:
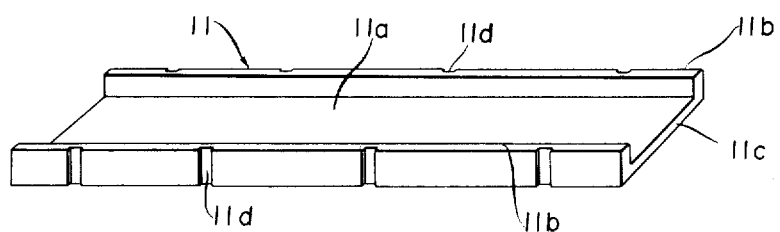
FIG. 9 is a perspective view of the pack support.

FIG. 9 shows the pack support indicated at 11. It is channelshaped having a groove 11a to receive and support a pack. In the case of an adult 3 to 4 packs are employed to make the hemodialyzer. In use, the individual packs are loaded in respective pack supports 11, which are then stacked together. Thus, the pack in the groove 11a of one of the pack supports in the stack is restrained by the bottom wall of the adjacent upper pack support and can swell only up to a predetermined extent. In other words, the swelling of the pack is restricted by both side walls 11b defining the groove 11a of the support.

Figure 8:
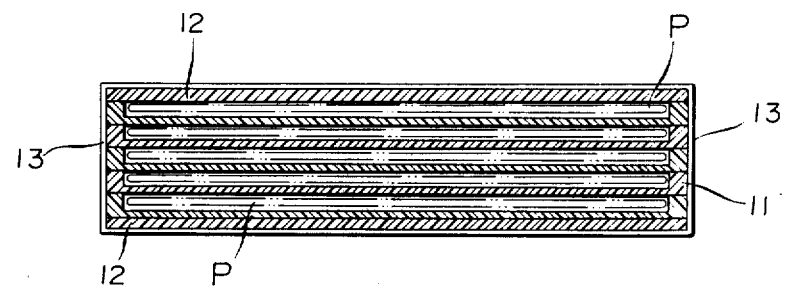
FIG. 8 is a sectional view of the embodiment.

FIG. 8 shows a plurality of packs indicated at p loaded in respective pack supports 11 stacked together. The stack is fastened between upper and lower case halves 12. As is shown in FIG. 1, end portions 12a of the case halves surround end portions of the packs protruding from the respective pack supports 11, and their end projections 12b engage the ends 11c of the pack supports 11 and serve to reinforce the union of the pack supports 11 and case halves 12 so as to prevent the pack supports from getting out of the case halves 12, 12 in the longitudinal direction. A plurality of bands are wound on the assembled case halves 12, 12 along grooves 11d and 12a to integrally unite the assembly. The plurality of blood lead tubes 4 and 5 are connected to the respective main pipes 14 and 15, and also the plurality of dialysate lead tubes 7 and 8 are connected to the respective main pipes 16 and 17, as is clearly shown in FIG. 10.

FIG. 11 shows the hemodialyzer A as described above, which is installed on an upright support 18 via a rotary holder 19 which is capable of displacement along the upright support and can be held at a desired position thereon by clamping means 20.

In the pack described above the main parts such as dialyzer tube 1 and outer sack are usually transparent. This is advantageous in that a broken dialyzer tube may be readily and promptly found by detecting blood blended into dialysate. The construction of the illustrated embodiment consisting of a plurality of packs connected in parallel and stacked together has a great advantage that even at the time of occurrence of the afore-mentioned accident the hemodialyzing work may be continued by clamping the lead tubes 5 and 7 of the broken dialyzer tube, in addition to many other advantages such as the possibility of obtaining compactness of construction, reducing the manufacturing cost and facilitating the handling. The device according to the invention is installed on the upright support 18 via the rotary holder in order to initially cause blood to flow upwardly through the lead tube 5 into the dialyzer tube 1 until air in the tube 1 is completely purged and then turn the device by 180° so as to cause downward flow of blood and upward flow of dialysate.

In the hemodialyzer of the foregoing construction according to the invention, the pack 11, pack support 11 and case half 12, all being a main component, are simple in construction and capable of mass production, so that they are very advantageous in view of the manufacturing cost. Also, they are small in size and convenient to handle. Further, since the resistance against the flow of blood is so small that no blood pump is needed. The required priming volume is also quite small; it is 30 to 40 millilitres per pack. Furthermore, the recovery of blood after the dialysis is very ready, and the total residual blood is of the order of several millilitres.

Regarding the dialyzing capacity of the packs of the illustrated structures, with a pack with a width of 170 mm, a length of 670 mm and a thickness of 4 mm (for the effective portion) and with blood and dialysate caused to flow at respective rates of 40 ml/min. and 100 ml/min., the urea clearance obtained was 17 ml/min.

What we claim is:

1. A hemodialyzer comprising at least one dialyzer pack including a flat dialyzer tube, a fibrous sheet of paper-like material directly over the outer surface of said dialyzer tube, a net directly over the outer surface of said fibrous sheet, and a flat sealed outer sack enclosing said dialyzer tube, fibrous sheet and net.

2. A hemodialyzer according to claim 1, wherein the outer surface of said fibrous sheet is rugged whereby said surface diffuses dialysate.

3. A hemodialyzer according to claim 1, wherein said pack includes blood lead tubes extending through said outer sack and communicating with said dialyzer tube, and dialysate lead tubes connected to and communicating with said outer sack.

4. A hemodialyzer according to claim 3, wherein said pack is supported by a channel shaped pack support having a bottom and spaced apart upstanding side walls extending therefrom.

5. A hemodialyzer comprising a plurality of dialyzer packs according to claim 4, said packs being stacked at a predetermined spacing determined by the height of said side walls, main blood lead pipes joining the blood lead tubes of said plurality of stacked packs, and main dialysate lead pipes joining the dialysate lead tubes of said stacked packs.

* * * * *